(12) United States Patent
Glemet

(10) Patent No.: US 6,193,215 B1
(45) Date of Patent: Feb. 27, 2001

(54) SYSTEM FOR UNWINDING AND LAYING WIRES IN PARTICULAR OF CATENARY FEED CABLES

(75) Inventor: Frédéric Glemet, Asnieres (FR)

(73) Assignee: Societe Des Anciens Etablissements L. Geismar (FR)

(*) Notice: Subject to any disclaimer, the term of this patent is extended or adjusted under 35 U.S.C. 154(b) by 0 days.

(21) Appl. No.: 09/224,769

(22) Filed: Jan. 4, 1999

(30) Foreign Application Priority Data

Jan. 5, 1998 (FR) .................................... 98 00023

(51) Int. Cl.⁷ .................................... B65H 59/00
(52) U.S. Cl. .................... 254/134.3 PA; 254/134.3 R
(58) Field of Search .................. 254/134.3 PA, 254/134.3 R, 134 FT

(56) References Cited

U.S. PATENT DOCUMENTS

| | | | |
|---|---|---|---|
| 2,951,596 | * 9/1960 | Winder et al. | 254/134.3 R |
| 4,421,301 | 12/1983 | Chapman. | |
| 4,531,714 | 7/1985 | Bahr. | |
| 5,048,797 | * 9/1991 | Theruer et al. | 254/134.3 R |
| 5,114,119 | * 8/1999 | Theruer et al. | 254/134.3 R |
| 5,826,860 | * 10/1998 | Theruer et al. | 254/134 R |
| 5,941,507 | * 8/1999 | Page | 254/134.3 PA |

FOREIGN PATENT DOCUMENTS

| | | | |
|---|---|---|---|
| 0713799 | 5/1996 | (EP) | B60M/1/28 |

* cited by examiner

*Primary Examiner*—Stepen F. Gerrity
*Assistant Examiner*—Lee Wilson
(74) *Attorney, Agent, or Firm*—Steinberg & Raskin, P.C.

(57) ABSTRACT

A system for unwinding and laying wires including a device for carrying a wire reel from which the wire to be laid is dispensed an device for unwinding and laying the wire, the device for carrying wire structured and arranged to be held against motion during the unwinding and laying of the wire, a vehicle to which the for unwinding and laying the wire is mounted, the vehicle being movable along a laying path. The device for unwinding and laying including a wire pulling unit with first and second clamping devices for gripping the wire, the first and second clamping devices being selectively adjustable from a clamped state in which clamping device holds the wire and a declamped state wherein the clamping device releases the wire and the first and second clamping devices being positionable from an extended clamped position in which the clamping device extends transversely beyond an obstacle located along the laying path a retracted declamped position in which the clamping device retracts to a clearance position transversely spaced from the obstacle.

21 Claims, 3 Drawing Sheets

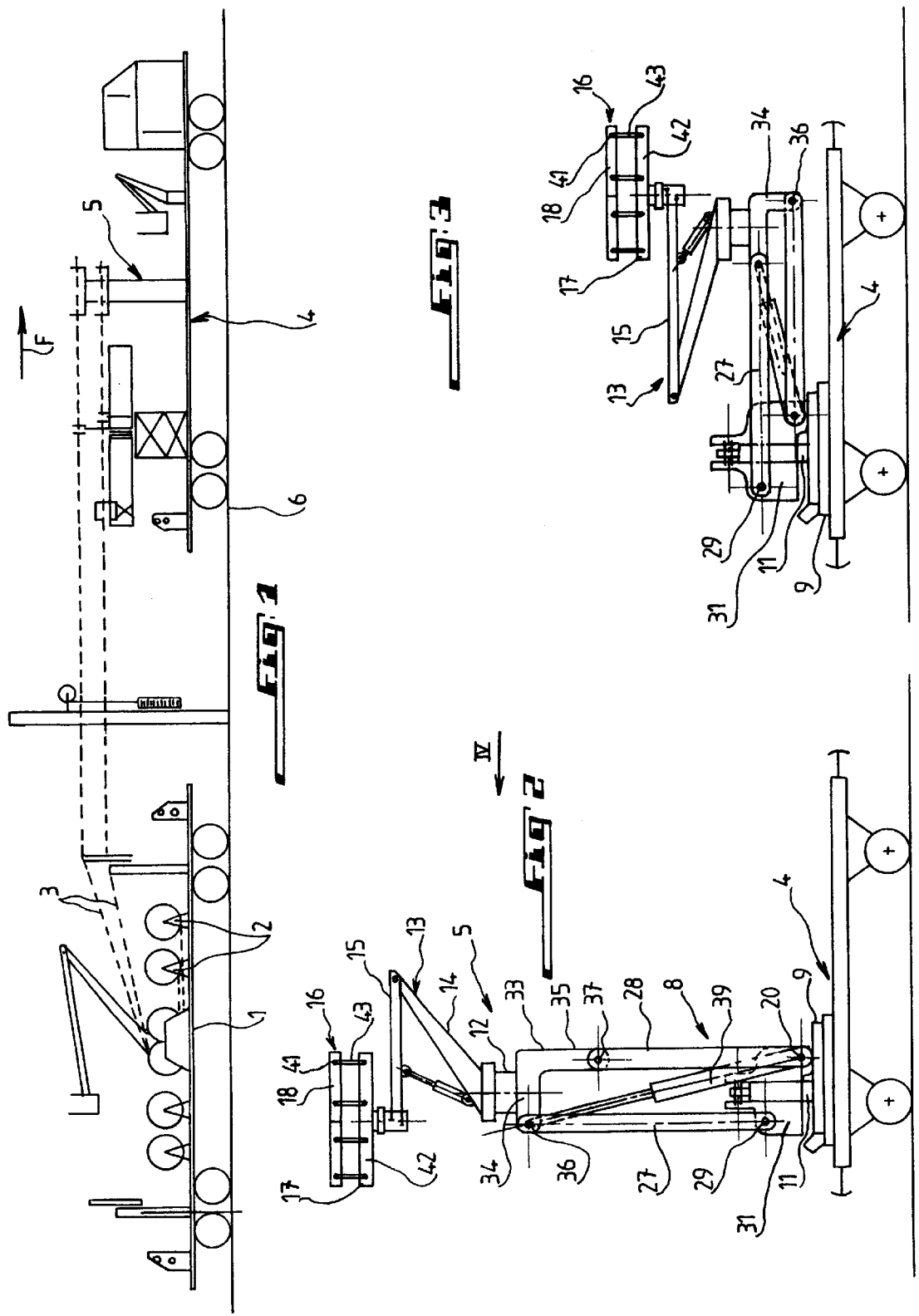

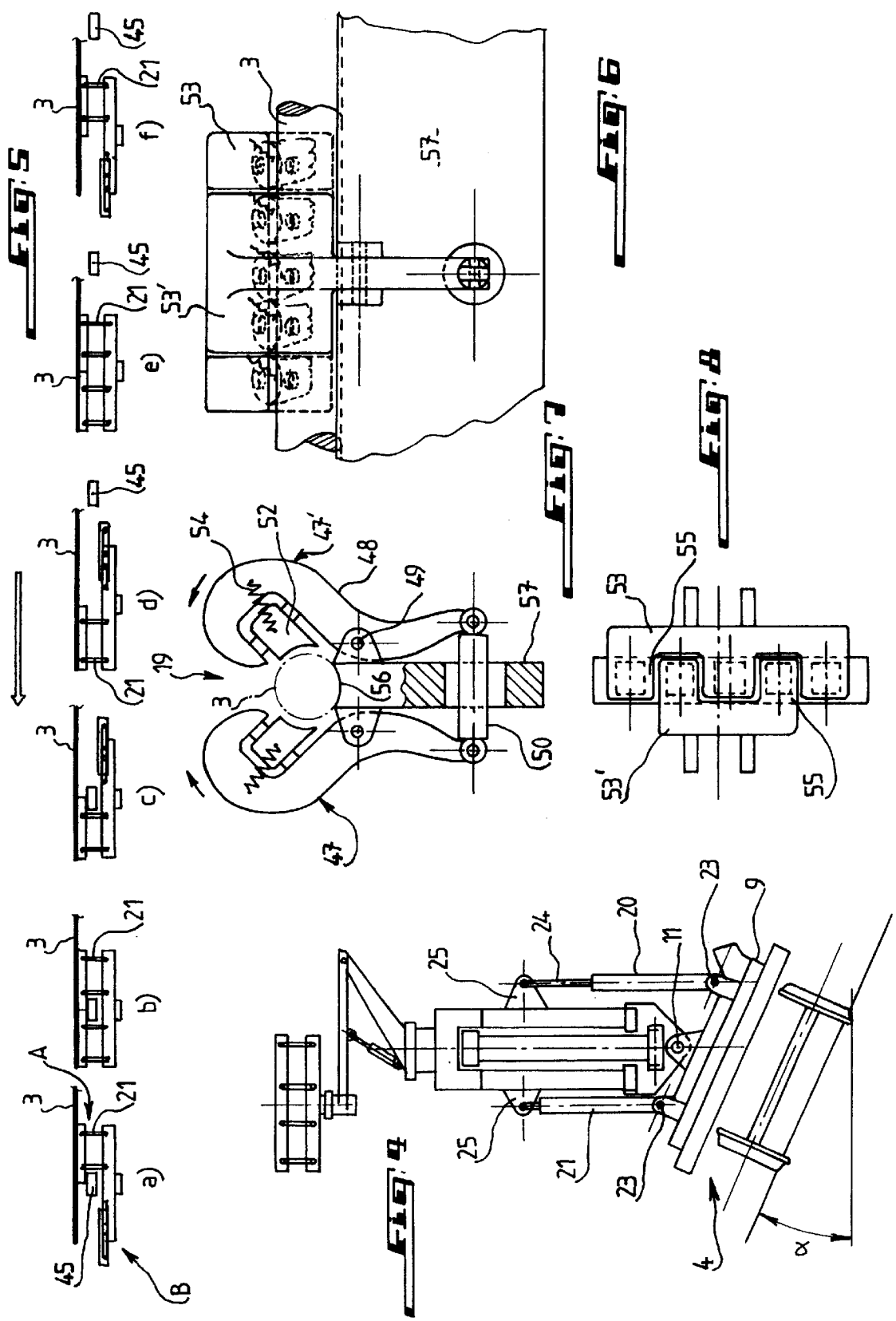

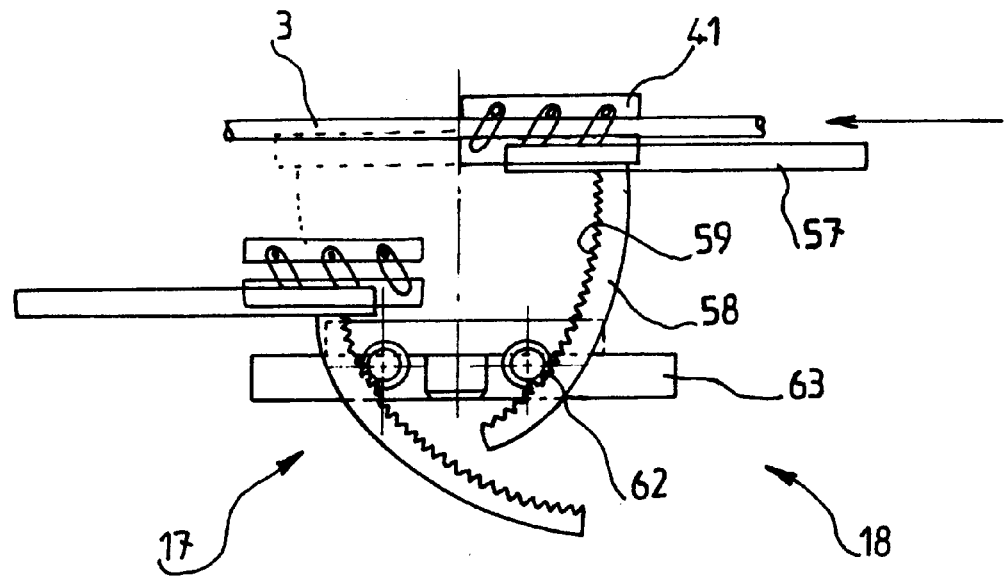
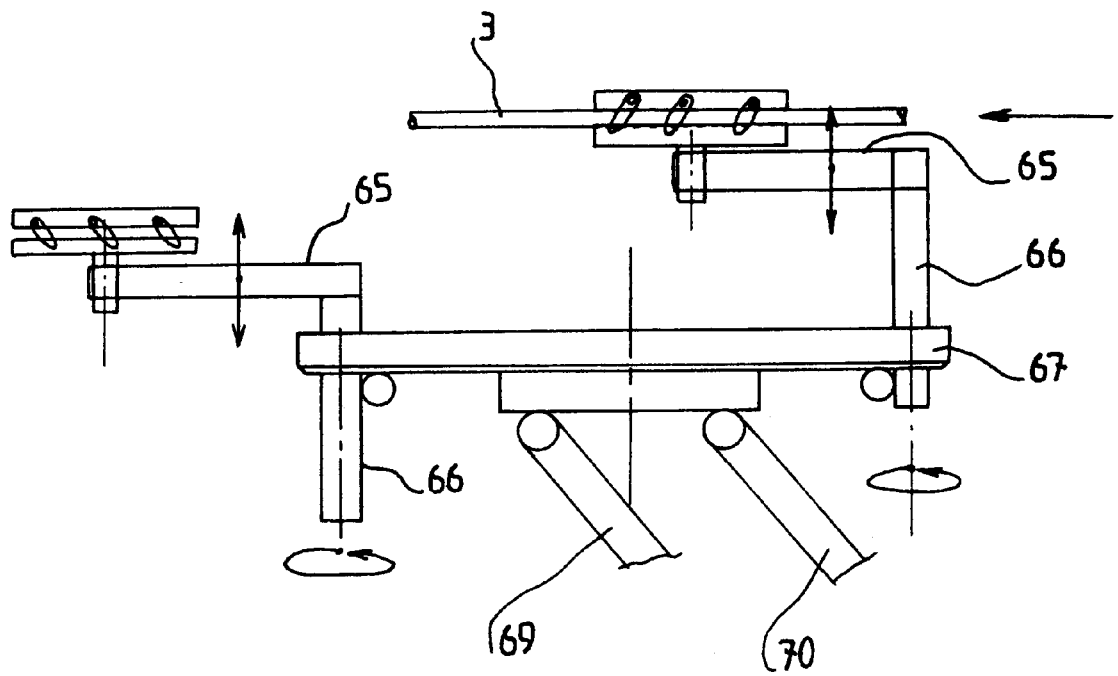

SYSTEM FOR UNWINDING AND LAYING WIRES IN PARTICULAR OF CATENARY FEED CABLES

FIELD OF THE INVENTION

The invention relates to a system for unwinding and laying wires such in particular as catenary power cables or like overhead contact wires with catenary suspension supported by a stationary supporting structure during the building and the renewal of catenary installations, of the type comprising a device carrying wire reels or drums from which are paid out the wires to be laid and means for unwinding and laying wires onto the supporting structure, the latter being likely to comprise obstacles opposing the unwinding and the laying, such as rigid gantry beams, crossings of catenary planes, crossed and communication equipments or the like.

BACKGROUND OF THE INVENTION

The systems of this kind, which are known, comprise a system carrying wire or cable reels which moves from one cable anchoring point to the following anchoring point upstream of an obstacle and then from an anchoring point downstream of the latter to the then next anchoring point.

The major inconvenience of the known systems is that they do not permit a continuous unwinding and laying of the wires in case of an obstacle.

OBJECTS AND SUMMARY OF THE INVENTION

The object of the present invention is to provide a system which copes with the inconveniences which have just been stated.

For these purposes, the system according to the invention is characterized in that the device carrying the reels or drums is a unit capable of being held against motion during the unwinding and the laying, the unwinding and laying device is mounted onto a vehicle displaceable along the unwinding path of travel and comprising a wire-drawing or pulling unit with two devices with a clamp or gripper for gripping a wire, mounted onto a support at a predetermined distance from each other in the axial direction of the wire, so as to be selectively displaceable between a position of the wire clearing the obstacle with the wire being held gripped and a position of the device clearing the obstacle without any wire.

BRIEF DESCRIPTION OF THE DRAWINGS

The invention will be better understood and further objects, characterizing features, details and advantages thereof will appear more clearly as the following explanatory description proceeds with reference to the attached diagrammatic drawings given by way of non limiting examples only illustrating several presently preferred specific embodiments of the invention and in which:

FIG. 1 is a diagrammatic side view of a system according to the invention;

FIG. 2 is a diagrammatic elevational view of a vehicle carrying an arrangement for unwinding and laying catenary cables according to the present invention, the arrangement assuming its expanded or spread out working position;

FIG. 3 is a view similar to FIG. 2 but showing the unwinding and laying arrangement in a collapsed or folded back position;

FIG. 4 is a view in the direction of the arrow IV of FIG. 2 in the case of a railway track in a superelevation or cant area;

FIG. 5 is a diagrammatic view illustrating the process of clearing an obstacle;

FIGS. 6 to 8 are side, axial and top views, respectively, of a first embodiment of a cable gripping clamp device; and FIGS. 9 and 10 are two diagrammatic side views of two other embodiments of a cable gripping clamp device according to the present invention.

DETAILED DESCRIPTION OF THE INVENTION

FIG. 1 shows by way of example a system according to the invention conceived and designed for the unwinding and the laying of the power wires and cables of a catenary installation of a railway track. This system essentially comprises a first vehicle 1 which carries a number of cable reels or drums 2 from which the cables shown at 3 may be paid out and a second vehicle 4 which comprises an arrangement 5 for unwinding and laying the wires 3. Both vehicles 1 and 4 are movable upon the railroad track shown at 6. During the process of winding and laying, the vehicle 1 is held against motion whereas the vehicle 4 is moving in the direction of the arrow F. The unwinding is carried out under mechanical stretching or tensioning in order to achieve the laying quality required for a good collection of the electric current by the electric machines of the trains which are to be running on the railway truck shown at 6. The vehicles 1 and 4 further comprise other equipments but since the latter do not relate to the invention, they will not be described.

Referring to FIGS. 2 and 3, an advantageous embodiment of the unwinding and laying arrangement 5 according to the invention will be described hereinafter, the vehicle 4, which carries this equipment, being, differently from FIG. 1, shown as a non powered vehicle only.

The arrangement 5 essentially comprises a post 8 which is rotatably mounted about a vertical axis on the vehicle by means of a slewing base 9 pivotable about a horizontal axis 11 and carries an intermediate turret 12 for supporting an assembly 13 consisting in the example shown of two pivotally interconnected arms 14 and 15 and provided with means for varying the angle formed by the arms and of which the end carries a wire drawing or pulling head 16 with two cable gripping and holding clamp devices, namely a forward one 17 and a rearward one 18 spaced by a predetermined distance from each other, in the direction of unwinding of the cable as more clearly seen on FIG. 5. The devices 17 and 17' are carried by a support rotatably mounted about a vertical axis and pivoting in a vertical plane on the end of the end arm 15.

The post 8 in the case of a railway track in a superelevation or cant area would pivot as a hole unit about the pivot axis 11 located at the level of the base 9, by means of two side jacks or power cylinders arranged on either side of the axis 11 and pivotally connected, in the example shown, with the jack body or cylinder at 23 to the rotatable base 9 and with the end of the piston rod 24 to side brackets 25 made fast to the post. The jacks or actuators 20, 21 are used as jacks for correcting the track superelevation or cant to always provide a vertical position of the post irrespective and independently of the transverse angle of slope α of the track (FIG. 4).

The post 8 itself is made as a deformable parallelogram of which the long sides consist of two pillars or standards 27 and 28, each one in the shape of a gantry (FIG. 4). Both pillars or standards 27, 28 are pivotally connected at 29 and 20, respectively, to the base or bottom 31 of the post at different heights and at the top to a bent element 33 which comprises a horizontal portion 34 carrying the swivelling turret 12 and a vertical portion 35, so that it may be pivotally connected to the upright 27 and to the upright 38, at 36 and 37, respectively, at different heights corresponding to the vertical shift or level difference of the pivotal connections 29 and 20 at the base of the parallelogram. The latter is deformable by means of a jack 39 of which the ends are pivotally connected to the top end of the upright 27 and to the bottom end of the other upright 28.

The post 8 has a size designed for supporting a perpendicular load equal to the total value of the tension or tightness applied to each cable at a height variable from 3 to 9 meters above the level of the floor of the vehicle 3.

Both gripping devices 17, 18 of the cable drawing or pulling unit 16 comprise each one a clamp for gripping cables 41 which is amovable between an upper cable gripping position A and a lower retracting position B in which the gripper or clamp may pass below or ahead of an obstacle when the cable has to be brought above or from the back of the latter as described hereinafter with more details with reference to FIG. 5. For that purpose in the embodiment of the gripping devices shown on FIGS. 2 to 5, both clamps or grippers are mounted onto a common support 42, each one through the medium of two parallel links 43 which are pivotable between a vertical cable gripping position and a horizontal retracting position. Thus is provided a parallelogram-shaped gripping clamp support.

FIG. 5 illustrates the process of clearing an obstacle shown at 45 such as a gantry extending at some height above the track in perpendicular relation thereto. Upon approaching the obstacle 45, the front or forward gripping clamp 17 is in its retracting position B with both links 21 in their substantially horizontal positions. The cable 3 is gripped and pulled by the reel gripping clamp only of which the links extend vertically. It is seen that the cable drawing head is placed vertically at such a height that the obstacle 45 is vertically located between the front and rear gripping clamps. During the displacement of the unwinding vehicle in the direction of the arrow, the front gripping clamp may pass underneath the obstacle whereas the upper rear gripping clamp may pass the cable above the obstacle or obstruction as seen on FIG. 5a. Then the front gripping clamp is caused to pivot into its elevated cable gripping position A as seen on FIG. 5b and it is the rear jaw which releases the cable and retracts according to FIG. 5c. It is only after the gripping head has reached the position shown on FIG. 5d in which the obstruction or obstacle is located behind the retracted rear gripping clamp that the latter is caused to return to its elevated position A according to FIG. 5e. As the cable 3 is again pulled by the rear gripping clamp, the front gripping clamp retracts again when approaching the next obstacle as seen on FIG. 5f. The front and rear gripping clamps 17 and 18 are therefore mounted onto a support, so as to be selectively displaceable between a position A of the wire clearing an obstacle with the wire 3 being kept gripped and a position B of clearing the obstacle without any wire.

Referring now to FIGS. 6 to 10, three embodiments of the cable gripping clamps will be described.

In the embodiment according to FIGS. 6 to 8, the gripping clamp 41 comprises two jaws 47, 47' of which each one comprises a double-armed lever 48 pivotally mounted onto a bracket 49 made fast to one side face of a support mounted for being vertically movable on the support of the wire pulling head. Both levers would pivot or swing in opposite pivoting directions as shown by arrows under the effect of a common jack or actuator 50 interposed between both lower ends of the levers and extending through the support. The opposite end of each lever is shaped as a support for a plurality of cable clamping chaps 52 with a fluted or chequered attack surface. As seen in particular on FIG. 8, the ends of the levers exhibit the shape of combs 53, 53', each tooth or prong exhibiting a U-shaped profile opening towards the cable 3, with a chap 52 supported between both legs of the U, displaceable towards the cable under the effect of a spring. 54. It appears from FIG. 8 that the comb-shaped end 53 of the lever 48 comprises three teeth or prongs 55 and therefore three clamping chaps 52 and the comb-shaped end 53' of the other lever comprises two teeth or prongs 55. As to the cable 3, it rests upon the top face 56 of the support or holder 57 which exhibits a suitable concave profile adapted to the profile of the cable. The levers 48 supporting the clamping chaps 52 are mounted onto the support or holder 57 to be pivotable between a spread opening position of the clamp permitting the passage of the cable between the ends supporting the chaps (FIG. 7) and a closed position in which the combs are mutually overlapping or interfitting into each other and the chaps 52 are caused to bear upon the cable under the effect of the springs 54 (FIG. 8). Thus the cable is clamped between the chaps 52 and the top concave surface 56 of the support. For improving the clamping effect, the chaps 52 are not directed in perpendicular relation to the peripheral face of the cable but inclined with respect to the latter as seen on FIG. 6.

As to the operation of the cable drawing head fitted with gripping devices according to FIGS. 6 to 8, in order to bring a device into its retracting position B (FIG. 5), the opening of the gripping clamp through spreading of the supporting levers 48 are operated by means of the control jacks 50 and the support of each front or rear gripping clamp is then selectively lowered for releasing the cable 3. For gripping the cable again, it suffices to impose on the gripping clamp the reverse movement and then to operate the closing of the clamp.

The embodiment of the cable pulling head shown on FIG. 9 exhibits the peculiarity that each gripping clamp 41 is mounted for being horizontally movable in the direction of the arrow on a support 57 itself displaceable in translation by means of an arcuate segment member 58 projecting from its bottom face and which is shaped as a toothed rack 59 meshing with a pinion or gear 62 rotatably mounted onto a support 63 which is common to both gripping devices 17, 18. On FIG. 9, the clamps are shown diagrammatically only. They may be provided in any suitable shapes, for example in accordance with FIGS. 6 to 9.

In the embodiment according to FIG. 10, the support of the clamps of the devices 17, 18 exhibits each one the shape of an L the horizontal leg 65 of which carries the clamp at its end whereas the vertical leg 66 is supported for being vertically movable and rotatable about its axis on a support 67 common to both devices. The various possibilities of motion are shown again by arrows. The figure shows both devices in their cable gripping position and in their retracted position with a view to clear an obstruction.

It should be pointed out that the clamp actuating jacks 50 and the displacements of the clamp supports may be remote controlled or automatically controlled by a suitable obstacle detecting or sensing device mounted onto the wire drawing head.

This FIG. 10 also shows that the arm supporting the cable pulling head, instead of consisting, in accordance with FIGS. 2 to 4, of a pivotally connected arm, may be provided in the shape of a deformable parallelogram of which both parallel longitudinal sides or links are denoted at 69 and 70.

Owing to its structure which has just been described, the invention permits the unwinding and the laying of the cables while clearing horizontal obstructions located at some height as seen on FIG. 5. The invention also permits the laying of cables even if obstacles are formed for example of vertical poles or masts, where it is necessary with respect to the track to pass behind these posts or masts. It then suffices to position the cable drawing head sidewise with respect to the track and to then place the support of the gripping devices vertically by means of the orientation mechanism pivotally connected to the end of the terminal arm by means of an orientation jack not shown.

By fitting the bottom of the parallelogram-shaped mast or pole with an orientation ring permitting an angle of rotation of twice 120°, it is possible to position the parallelogram on either side of the vehicle in perpendicular relation to the track for working not only on the masts of the track where the vehicle is running but also on those of the adjacent track. The taking up of the pulling force of 2000 daN under this equipment positioned at 90° involves a consequent reinforcement of the base parallelogram and of all the elements. The versatility of the cable unwinding and laying system according to the invention is obtained owing to some structural characterizing features which have been described hereinabove but which are briefly repeated. As to the post or mast, it is seen that its lower portion provided with a great rigidity is arranged upon a table fastened onto the floor of the vehicle. This table comprises two semi-circular sectors in which the base of the parallelogram may be caused to pivot. That contrivance allows to keep the upper portion perfectly centred with respect to a track in a cant or superelevation area. This also provides a positioning of the axis of drawing the cable. The pulling force always lies along the axis of the parallelogram. The forces due to the height-tension torque of the cable always remain centred. The turret located at the end of the base parallelogram constitutes a perfect seat for orienting the upper portion comprising itself too a parallelogram or a pivotally connected arm. The support of the gripping devices may be oriented owing to a jack, the cable drawing head may be positioned during the pulling so that the jack be always capable of taking up the pulling forces as a thrust. The head is mounted onto a perfectly vertically swivelling orientation ring. During the pulling of the cable, when the latter is gripped within the reel clamp, this orientation remains floating. During the restarts upon moving past obstacles, the orientation is on the contrary blocked.

To avoid a problem of overlength of the cable due to taking it over again at each obstacle, the clamp may during the clamping either be moved backwards or forwards by the value of the clamp grip in order that at each obstacle, the original position be recovered or reassumed. This compensation may be done during the advancement between two obstacles and under tension by carrying out a very slow movement. The clamp supports may be fitted with height sensing cells in order to pass closest to the obstacle in the vertical direction. An additional detection may be achieved in order to cause the passing over an obstacle through successive retraction and positioning of the clamp as complete cycles in order to not stop the unwinding or forward running of the unwinding vehicle.

In summary, the fact of having the clamping support always in the horizontal position in parallel relation to the railway track and of being able to restart on a stable structure the pulling force on the cable, the whole unit may indifferently work in one direction or in the other one. The mast-intermediate turret-upper arm configuration, provided with orientation means, permits to reach great heights to obtain a very stable unit and to have the clamps not subjected to torsion or twist. Since the support of the clamps always is perfectly horizontal, it is possible to pass closest to the obstacles. The load and the taking up again of the cable on the obstacle may be carried out in automatic cycles, thereby permitting that the progress of the cable laying work be not discontinued.

What is claimed is:

1. A system for unwinding and laying wires on a fixed supporting structure with obstacles to the laying of the wire, comprising:

a device for carrying a wire reel from which the wire to be laid is dispensed;

means for unwinding and laying said wire;

wherein said device for carrying wire is a unit structured and arranged to be held against motion during the unwinding and laying of said wire;

a vehicle to which said means for unwinding and laying said wire is mounted said vehicle being movable along a laying path;

wherein said means for unwinding and laying said wire comprises a wire pulling unit with first and second clamping devices for gripping said wire, said first and second clamping devices being mounted upon a support at a predetermined distance from one another in an axial direction of the wire and a moving direction of the vehicle, each one of the first and second clamping devices being selectively adjustable from a clamping state wherein said clamping device grips said wire and a declamping state wherein said clamping device releases said wire and wherein each clamping device is positionable from an extended clamping position wherein said clamping device is in its clamping state with said wire being gripped and enabled to extend beyond an obstacle located along said laying path to a retracted declamping position wherein said clamping device is retracted to a clearance position transversely spaced from said obstacle.

2. A system according to claim 1, wherein each clamping device comprises a clamp displaceable between a position transversely spaced from said obstacle on the same side as the vehicle to which said means for unwinding and laying said wire is mounted, with respect to said obstacle, and a position transversely spaced from said obstacle on the side opposite to the vehicle with respect to the obstacle.

3. A system according to claim 1, wherein the wire pulling unit is mounted to a wire pulling unit support assembly, and wherein said support assembly is mounted to said vehicle to enable the rotation of said wire pulling unit about an axis of rotation perpendicular to a floor of said vehicle and the pivoting of said wire pulling unit about a pivot axis in a plane perpendicular to said axis of rotation.

4. A system according to claim 3, wherein said wire pulling unit support assembly comprises:

a post assembly rotatably mounted about said axis of rotation and pivotable about said pivot axis;

an arm assembly having a first end coupled to an upper end of said post assembly and a second end coupled to said wire pulling unit.

5. A system according to claim 4, wherein said arm assembly is coupled to the upper end of said post assembly via a rotatable intermediate turret.

6. A system according to claim 4, wherein said post assembly comprises first and second members forming a parallelogram, said parallelogram being deformable by a control means.

7. A system according to claim 4, wherein said arm assembly comprises a first arm pivotally mounted to a second arm.

8. A system according to claim 3, wherein said support assembly comprises means for adjusting the angular displacement of said support assembly with respect to a railway track upon which said vehicle is moving for enabling said support assembly to remain in a vertical position when said railway track is in a plane angularly displaced from a horizontal position.

9. A system according to claim 3, wherein said wire pulling unit support assembly is transversely displaceable relative to a railway track upon which said vehicle is moving.

10. A system according to claim 1, wherein each of said first and second clamping devices each comprise a first and second jaw structured and arranged to pivot from said clamped state to said declamped state.

11. A system according to claim 10, wherein each of said first and second jaws comprise clamping chaps in the shape of combs, fitted with first and second spring cams mutually interfitted when said first and second jaws are in said clamped state.

12. A system according to claim 1, wherein each of said clamp devices comprises a clamp mounted on a clamp support movable by a mechanism in the same of a deformable parallelogram.

13. A system according to claim 1, wherein each of said claim devices comprises a clamp mounted on a clamp support comprising an element in the form of an arcuate toothed rack displaceable by means of a pinion mounted on a support common to both the first and second clamp devices.

14. A system according to claim 1, wherein said wire pulling unit is movable in a horizontal position of winding and laying wires behind vertically extending obstacles.

15. A system for unwinding and laying wires comprising:

a device for carrying a wire reel from which the wire to be laid is dispensed;

means for unwinding and laying said wire;

a vehicle to which said means for unwinding and laying said wire is mounted said vehicle being movable along a laying path;

wherein said means for unwinding and laying said wire comprises a wire pulling unit with first and second clamping devices for gripping said wire, said first clamping device being mounted to a front end of said vehicle and said second clamping device being mounted to a rear end of said vehicle and wherein said first and second clamping devices are mounted upon a support at a predetermined distance from one another in an axial direction of the wire and wherein each one of the first and second clamping devices are selectively adjustable from a clamped state wherein said clamping device holds said wire and a declamped state wherein said clamping device releases said wire and wherein each of said first and second clamping devices are selectively positionable from an extended clamped position wherein said clamping device extends transversely beyond an obstacle located along said laying path a retracted declamped position wherein said clamping device is retracts to a clearance position transversely spaced from said obstacle.

16. A system according to claim 15, wherein the wire pulling unit is mounted to a wire pulling unit support assembly, and wherein said support assembly is mounted to said vehicle to enable the rotation of said wire pulling unit about an axis of rotation perpendicular to a floor of said vehicle and the pivoting of said wire pulling unit about a pivot axis in a plane perpendicular to said axis of rotation.

17. A system according to claim 16, wherein said wire pulling unit support assembly comprises:

a post assembly rotatably mounted about said axis of rotation and pivotable about said pivot axis;

an arm assembly having a first end coupled to an upper end of said post assembly and a second end coupled to said wire pulling unit.

18. A system according to claim 15, wherein said arm assembly is coupled to said upper end of said post assembly via a rotatable intermediate turret.

19. A system according to claim 15, wherein said post assembly comprises first and second members forming a parallelogram, said parallelogram being deformable by a control means.

20. A system according to claim 15, wherein said support assembly comprises means for adjusting the angular displacement of said support assembly relative to a horizontal axis.

21. A system according to claim 15, wherein each of said first and second clamping devices each comprise a first and second jaw structured and arranged to pivot from said clamped state to said declamped state.

* * * * *